United States Patent
Schumann

(10) Patent No.: US 9,709,788 B2
(45) Date of Patent: Jul. 18, 2017

(54) OPTICAL ARRANGEMENT AND A MICROSCOPE

(71) Applicant: LEICA MICROSYSTEMS CMS GMBH, Wetzlar (DE)

(72) Inventor: Christian Schumann, Giessen (DE)

(73) Assignee: LEICA MICROSYSTEMS CMS GMBH, Wetzlar (DE)

(*) Notice: Subject to any disclaimer, the term of this patent is extended or adjusted under 35 U.S.C. 154(b) by 0 days.

(21) Appl. No.: 14/420,905

(22) PCT Filed: Aug. 6, 2013

(86) PCT No.: PCT/DE2013/200105
§ 371 (c)(1),
(2) Date: Feb. 11, 2015

(87) PCT Pub. No.: WO2014/026683
PCT Pub. Date: Feb. 20, 2014

(65) Prior Publication Data
US 2015/0205087 A1 Jul. 23, 2015

(30) Foreign Application Priority Data
Aug. 16, 2012 (DE) .................. 10 2012 214 568

(51) Int. Cl.
*G02B 21/06* (2006.01)
*G02B 21/00* (2006.01)
(Continued)

(52) U.S. Cl.
CPC ......... *G02B 21/06* (2013.01); *G02B 21/0032* (2013.01); *G02B 21/18* (2013.01); *G02B 21/367* (2013.01); *G02B 21/0076* (2013.01)

(58) Field of Classification Search
CPC .. G02B 21/248; G02B 21/241; G02B 21/025; G02B 21/06; G02B 21/26; G02B 21/34
(Continued)

(56) References Cited

U.S. PATENT DOCUMENTS 7,746,552 B2 * 6/2010 Hecker ................. G02B 21/06
250/225
7,796,328 B2 * 9/2010 Wolleschensky .... G02B 21/002
359/385
(Continued)

FOREIGN PATENT DOCUMENTS

DE       10257423 A1    6/2004
DE    102004034957 A1   2/2006
(Continued)

OTHER PUBLICATIONS

Y. Wu et al: "Inverted selective plane illumination microscopy (iSPIM) enables coupled cell identity lineaging and neurodevelopmental imaging in *Caenorhabditis elegans*", Proceedings of the National Academy of Sciences, vol. 108, No. 43, Oct. 25, 2011, pp. 17708-17713, XP055089764, the whole document.

*Primary Examiner* — Mohammed Hasan
*Assistant Examiner* — Rahman Abdur
(74) *Attorney, Agent, or Firm* — Leydig, Voit & Mayer, Ltd.

(57) ABSTRACT

An optical arrangement in a microscope includes an illumination device configured to generate an illuminating light beam extending on an illumination side. A splitting device is configured to split the illuminating light beam into at least two partial beams. A mirror arrangement is configured to reflect the partial beams into an illumination region for plane illumination of a specimen. Detection optics are arranged on a side of the illumination region facing away from the illumination side.

12 Claims, 11 Drawing Sheets

(51) Int. Cl.
*G02B 21/36* (2006.01)
*G02B 21/18* (2006.01)

(58) Field of Classification Search
USPC ....... 359/380, 381, 382, 383, 384, 388, 391, 359/392, 393, 394, 396
See application file for complete search history.

(56) References Cited

U.S. PATENT DOCUMENTS

| | | |
|---|---|---|
| 2008/0068710 A1 | 3/2008 | Wolleschensky |
| 2011/0036996 A1* | 2/2011 | Wolleschensky .. G01N 21/6458 250/459.1 |
| 2011/0122488 A1* | 5/2011 | Truong ............. G01N 21/6408 359/385 |
| 2011/0310475 A1* | 12/2011 | Iketaki ............... G01N 21/6458 359/388 |
| 2014/0042339 A1 | 2/2014 | Stelzer et al. |
| 2014/0300958 A1 | 10/2014 | Knebel et al. |

FOREIGN PATENT DOCUMENTS

| | | |
|---|---|---|
| DE | 202011110077 U1 | 11/2012 |
| EP | 2587295 A1 | 5/2013 |
| JP | 05164970 A | 6/1993 |
| WO | WO 2011059826 A2 | 5/2011 |

* cited by examiner

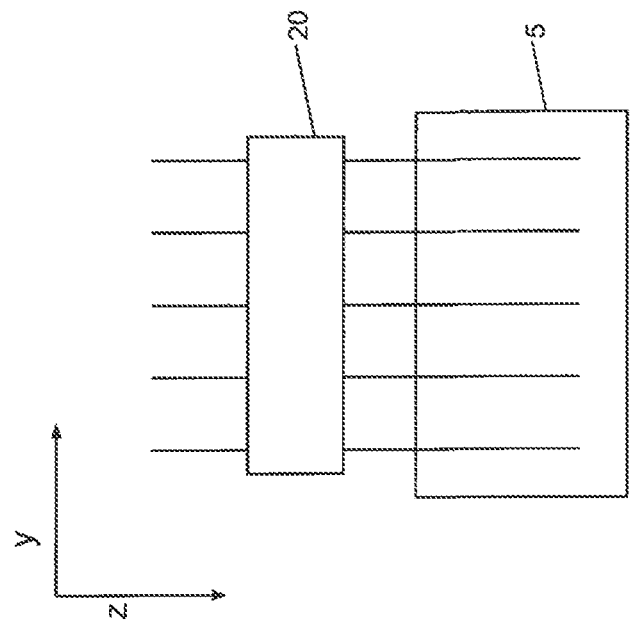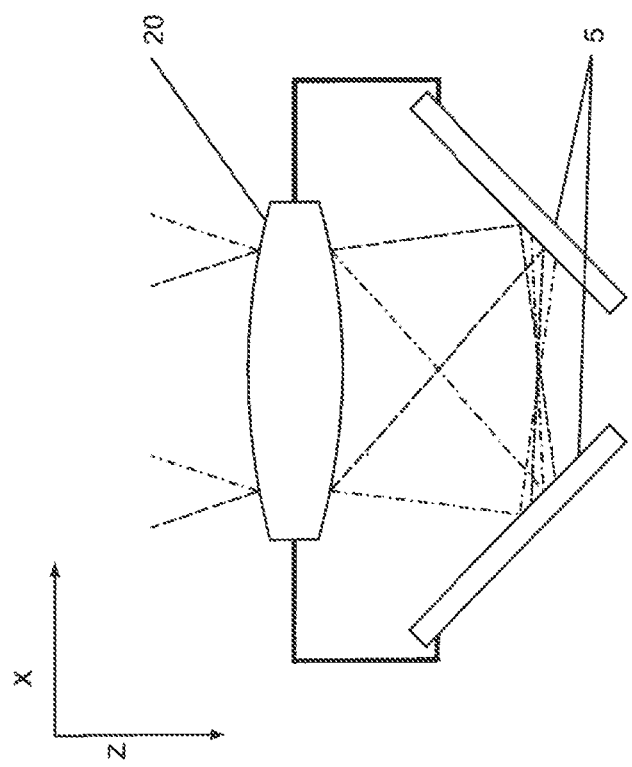
Fig. 2

OPTICAL ARRANGEMENT AND A MICROSCOPE

CROSS-REFERENCE TO PRIOR APPLICATIONS

This application is a U.S. National Phase Application under 35 U.S.C. §371 of International Application No. PCT/DE2013/200105, filed on Aug. 6, 2013, and claims benefit to German Patent Application No. DE 10 2012 214 568.0, filed on Aug. 16, 2012. The International Application was published in German on Feb. 20, 2014 as WO 2014/026683 under PCT Article 21(2).

FIELD

The present invention relates to an optical arrangement in a microscope, comprising an illumination device for generating an illuminating light beam extending on the illumination side, a splitting device for splitting the illuminating light beam into at least two partial beams and a mirror arrangement for reflecting the partial beams into an illumination region for plane illumination of a specimen. The present invention further relates to a microscope comprising a corresponding optical arrangement.

BACKGROUND

To observe living biological systems using a light-optical microscope, it is very important to keep photo-induced damage to a specimen as low as possible. For this purpose, the concept of illumination using a light sheet in the detection plane of the microscope has been developed. This makes possible a microscope which uses selective plane illumination microscopy (SPIM). In this case, the propagation direction of the illuminating light is perpendicular to the detection direction, it being possible for said light to be coupled into the specimen volume via illumination optics, for example a second illumination lens, which is perpendicular to the detection lens. In this case, shading effects may be caused by the specimen. It is therefore expedient to illuminate the specimen from different directions in order to overcome this problem. This has hitherto been carried out in chronological succession and/or with a high level of mechanical complexity. The microscopic specimen preparation is heavily influenced by this, and is often not compatible with conventional light-optical microscopy.

DE 10 2004 034 957 A1 discloses an optical arrangement in a microscope, in which an illuminating light beam extending on an illumination side is generated by means of an illumination device. The illuminating light beam is split into two partial beams Ls1 and Ls2 by means of a splitting device T. The partial beams are reflected into an illumination region by means of a mirror arrangement R1, R2 for plane illumination of a specimen.

Specifically, the two partial beams Ls1 and Ls2 are guided laterally past a lens Lz through light guides LF formed in a housing H and are then reflected into the illumination region towards the specimen via the mirror arrangement. The lens Lz is arranged inside the housing H, such that the lens dimensions need to be adjusted to the dimensions of the housing, or vice versa. This ultimately results in a complex construction having light guides LF formed in the housing H and a lens adjusted to fit therein. It is often not possible to freely select the lens owing to the dimensional constraints imposed by the housing. The lens which is adjusted to fit into the housing detects light signals from the illumination side.

Furthermore, DE 102 57 423 A1 discloses an optical arrangement in a microscope, using which plane illumination of a specimen is likewise possible. Specifically, the known arrangement comprises two mutually perpendicular lenses for illumination on one hand and detection on the other. An arrangement of this type requires a very specifically adapted specimen mount, and can often only be produced with difficulty in terms of its geometry and structure.

SUMMARY

In an embodiment, the present invention provides an optical arrangement in a microscope. An illumination device is configured to generate an illuminating light beam extending on an illumination side. A splitting device is configured to split the illuminating light beam into at least two partial beams. A mirror arrangement is configured to reflect the partial beams into an illumination region for plane illumination of a specimen. Detection optics are arranged on a side of the illumination region facing away from the illumination side.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 2 is a schematic view of an embodiment of the illumination optics viewed from two sides.

DETAILED DESCRIPTION

Figure 1:
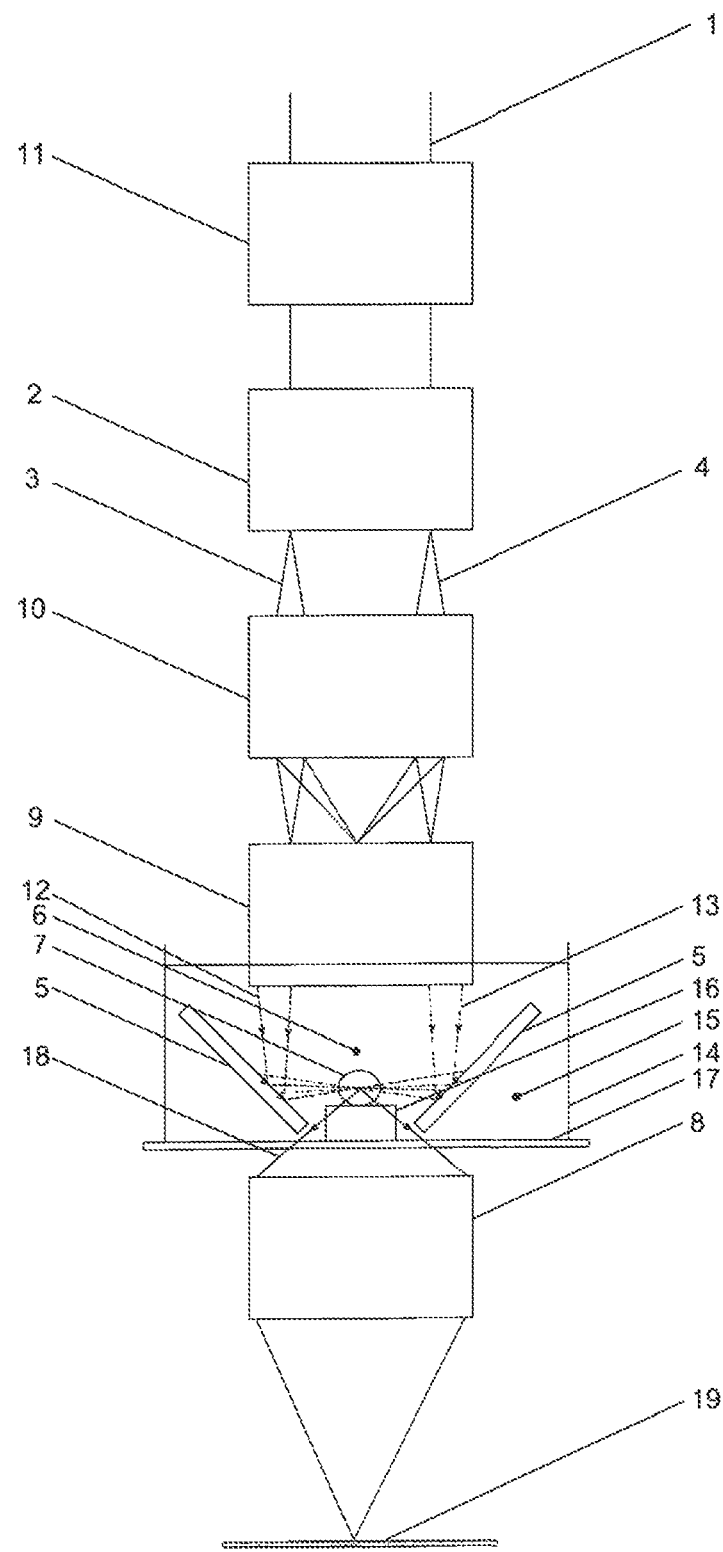
FIG. 1 is a schematic view of a first embodiment of an optical arrangement according to the invention.

Proceeding from the known prior art according to DE 10 2004 034 957 A1, an embodiment of the present invention is aimed to designing and developing an optical arrangement and a microscope of the type mentioned at the outset such that flexible use using structurally simple means are achieved.

In an embodiment, an optical arrangement is characterised by detection optics which are arranged on the side of the illumination region facing away from the illumination side.

According to an embodiment of the invention, it has first been recognised that in an optical arrangement having plane illumination, it is not necessary to produce the illumination optics and the detection optics on the same side of an illumination region or a specimen. As a result, the illumination optics and the detection optics can be designed independently of each other, whereby a high level of flexibility in terms of design and adaptation to different fields of application is ensured. In particular, the dimensions and design of a lens which is used for detection are no longer linked to any dimensions of a housing having light guides. Again according to an embodiment of the invention, detection optics are specifically arranged on the side of the illumination region facing away from the illumination side. This provides particularly varied design options, both for the illumination optics and for the detection optics, since there is the greatest possible spatial separation between the illumination optics and the detection optics.

Therefore, flexible use using structurally simple means is achieved by the optical arrangement according to an embodiment of the invention and the microscope according to an embodiment of the invention.

Specifically, illumination optics which are arranged on the illumination side may be constructed so as to be coaxial with the detection optics. In each case, illumination optics are separate from the detection optics, so the selection of a detection lens can be adapted to any experimental situation, irrespective of the illumination optics. The coaxial assembly of the illumination optics and the detection optics results in a particularly simple structure of the optical arrangement.

Depending on the use and with respect to a structurally simple design, the mirror arrangement may comprise one or more groups of mirrors or plane mirrors, or a ring mirror or a plurality of ring mirror segments. In terms of the specific design of the mirror arrangement, different uses may be taken into account.

In terms of simply and reliably splitting the illuminating light beam into at least two partial beams, the splitting device may comprise polarisation optics or elements for pupil division, preferably reflective or transmissive elements. Alternatively, the splitting device may comprise at least one prism or diaphragm. In each case, the splitting device may be formed as a module, in order for it to be easily implemented and arranged in an optical arrangement or a microscope.

In an advantageous embodiment, the splitting device, taken in isolation or in combination with remaining elements of the illumination optics, may make it possible to generate light sheets from the partial beams. Alternatively, a unit for respectively generating a light sheet from the partial beams may be arranged downstream of the splitting device. A unit of this type for respectively generating a light sheet may, in a yet more advantageous manner, be formed as a module, in order to be able to be integrated easily into an optical assembly or into a microscope.

Specifically, the unit for respectively generating a light sheet may comprise cylindrical optics or a scanner. Both embodiments make it possible to reliably generate a light sheet. The selection of one or the other generation technique may advantageously be made depending on the particular use.

Advantageously, the partial beams or light sheets may be spaced from an optical axis in a predeterminable manner and may be guided in parallel with the optical axis or close to the optical axis at an angle that differs from 0° to the optical axis. Owing to the guidance of the partial beams or light sheets with spacing from the optical axis or close to the optical axis, there remains on the optical axis a relatively large usable region for arranging the specimen. This makes it possible to examine a plurality of different specimens, which often take up a considerable amount of space.

With respect to a further advantageous embodiment of the optical arrangement or of the microscope, the arrangement may comprise a unit for controlling and/or influencing the coherence of the illuminating light beam. A unit of this type may, in a yet more advantageous manner, be formed as a module which for example, when viewed in the illumination direction, may still be arranged upstream of the splitting device inside the optical arrangement. Using a unit of this type, the interferability or the interference behaviour of the partial beams may be advantageously influenced and/or configured in the illumination region of the specimen.

In a further advantageous embodiment, the arrangement may comprise a unit for controlling and/or influencing the interferability of the partial beams or light sheets in the illumination region. In this respect, the arrangement may alternatively or additionally comprise a unit for selectively influencing the polarisation state and/or the coherence length of at least one partial beam or light sheet. Furthermore, the arrangement may comprise a unit for changing the phase of at least one partial beam or light sheet.

In terms of reducing shading effects, and in the case of the structured illumination of the direction-independent increase in resolution, it may be possible to set or alter the polar angle of an incident direction of the partial beams or light sheets relative to the illumination region or relative to the specimen. As a result, illumination can take place from desired sides of the specimen. Specifically and in a particularly simple embodiment, the splitting device, and more preferably the splitting device and the mirror arrangement, may be rotatable about an optical axis for this purpose.

The optical arrangement according to the invention produces a system for plane illumination which is simple to implement and can be adapted to a conventional (inverted) light-optical microscope. In this case, it is possible to illuminate the illumination plane or the illumination region from several directions at the same time.

Other important aspects of embodiments of the present invention are explained in the following:

By it being possible to selectively influence the polarisation states of the light sheets, there is the option of influencing the interferability thereof, if a light source having a sufficient coherence length is used. In particular, the present invention makes it possible to generate counter-rotating pairs of light sheets and to generate light-sheet illumination using the full polar-angle spectrum of $2\pi$.

To easily adapt the concept of plane illumination to a conventional inverted light-optical microscope, it is expedient to construct the illumination optics to be coaxial with the detection optics (like a conventional condenser) and to bring about the deflection of the illuminating light outside the illumination optics. For this purpose, within the context of the invention a mirror arrangement which is in the field of view of the illumination optics is provided upstream of the illumination optics. In this case, said mirror arrangement may be one or more groups of opposing plane mirrors having a suitable tilt angle, or also may be a ring mirror. To illuminate the specimen from the side using this mirror arrangement, the illumination optics are used outside the optical axis, so that a usable region for arranging the specimen is produced on the optical axis shared by the illumination optics and detection optics.

The purpose of the illumination optics is the defined coupling-in of the illuminating light in the region of the sample and, depending on the embodiment, the generation of the light sheet. In this case, said optics may be cylindrical optics in the simplest case, optionally having a pre-fabricated glass plate for covering an embedding medium. It is however also conceivable to use a more complex optical system, for example a microscope lens, and, for generating the light sheet, to use either cylindrical optics for focusing into the pupil of the illumination optics (simultaneous illumination of the field) or a scanner for sequentially scanning the field.

Within the context of an embodiment of the present invention, the illumination optics are simultaneously illuminated with a plurality of beams of light, so that the illuminating light simultaneously illuminates the specimen from at least two directions. The illuminating light may in this case be split into this plurality of partial beams for example by a polarisation-optical concept, or by pupil division. In the case of pupil division, this may be carried out by reflective or transmissive elements and may achieve discrete or continuous division of the light.

Within the context of another embodiment of the present invention, the interferability of the light beam may be influenced in the region of the specimen. In this case, the interferability may either be influenced by polarisation-optical methods or by a modification of the coherence length of the illuminating light, for example by scattering. When splitting the light into a discrete quantity of partial beams, this may take place in a targeted manner per partial beam, for example by spatial separation or polarisation-optical methods. If the illuminating light is split into two partial beams, the polarisation states of the two partial beams may be produced orthogonally to each other by suitable measures. If the illuminating light is split into more than two partial beams, the interferability may be influenced by changing the coherence length.

When there is coherence and the individual partial beams have the same polarisation direction relative to one another, illumination which is structured over the field of view is produced in the specimen and allows the image to be reconstructed at an increased resolution. For this purpose, the option of changing the phase of the individual partial beams of the illuminating light is necessary, and this is readily possible when spatially separating the partial beams, and is also possible using double-refractive elements when splitting the partial beams. If there is no interferability, for coherence or polarisation reasons, it is possible to homogenously illuminate the image field. This also occurs if an odd number of coherent partial beams having equidistant polar-angle differences are used.

Rotating the polar angle of the incident direction of the partial beams relative to the specimen—in the case of structured illumination, also rotating the direction of structuring makes it possible to further reduce shading effects, and in the case of structured illumination makes a direction-independent increase in resolution possible. For this purpose, interference patterns may also be generated in the specimen which are formed by partial beams, the relative propagation directions of which enclose an angle that is different from 180°. For example, an angle of the partial beams of 90° relative to each other produces structuring which is rotated by 45°.

FIG. 1 is a schematic view of a first embodiment of an optical arrangement according to the invention in a microscope. The optical arrangement comprises an illumination device for generating an illuminating light beam 1 extending on an illumination side. Furthermore, the optical arrangement comprises a splitting device 2 for splitting the illuminating light beam 1 into at least two partial beams 3 and 4, and a mirror arrangement 5 for reflecting the partial beams 3 and 4 into an illumination region 6 for plane illumination of a specimen 7. In terms of flexible use using structurally simple means, the optical arrangement further comprises detection optics 8 which are arranged on the side of the illumination region 6 facing away from the illumination side. In other words, all the other optical elements which are used to illuminate the specimen 7, such as the splitting device 2 and the mirror arrangement 5, are arranged on the illumination side in addition to the illuminating light beam 1. Only the detection optics 8 are arranged on the side of the illumination region 6 facing away from the illumination side. This spatial separation of the optical elements used for illumination from the detection optics 8 makes a simple construction of the optical arrangement possible.

In the embodiment shown here, illumination optics 9 which are arranged on the illumination side are furthermore constructed so as to be coaxial with the detection optics 8. The mirror arrangement 5 consists of two mutually opposing plane mirrors, so that it is possible to illuminate the specimen 7 from directions which are offset from each other by 180°.

A unit 10 for respectively generating a light sheet from the partial beams 3 and 4 is arranged downstream of the splitting device 2. The unit 10 is formed as a module, in the same way as the splitting device 2.

The partial beams 3 and 4 are guided so as to be spaced from an optical axis. In this case, the optical axis extends in parallel with the illuminating light beam 1 through the specimen 7. In this region of the optics, that is to say downstream of the splitting device 2, the partial beams 3 and 4 are not necessarily spaced from the optical axis, but can also be tilted, in the sense of a field angle. The Fourier-transformed property of illumination optics, for example a microscope lens, will then transform this tilting into spacing in the region of the specimen 7.

Furthermore, the arrangement comprises a unit 11 for controlling and/or influencing the coherence of the illuminating light beam 1. The unit 11 is also formed as a module.

The partial beams 12 and 13 emerging from the illumination optics 9 are suitable for generating a light sheet in the region of the specimen 7. For this purpose, said partial beams are reflected onto the specimen 7 by means of the mirror arrangement 5.

The specimen 7 is arranged in a specimen container 14 having an embedding medium 15 arranged therein. The specimen 7 is arranged on a spacer 16, which in turn is arranged on a specimen carrier 17. The specimen carrier 17 can be adjusted or positioned in the axial direction, that is to say along the optical axis.

An aperture beam 18 is guided to a photodetector 19 or a camera via the detection optics 8. Alternatively or additionally, observation could take place using an eyepiece.

The concept of the present embodiment is modular in nature and can be dismantled into several parts which do not necessarily have to be present in all possible embodiments of the invention. Furthermore, the order of the various modules or sub-systems may differ from the order shown in FIG. 1. Interfaces between the modules or sub-systems are the respective entrance and exit pupils. The present embodiment is not characterised by the individual modules per se, but rather the arrangement of the individual modules to form a complete system for simple multi-directional plane illumination.

The unit 11 for controlling and/or influencing the coherence of the illuminating light beam 1 is used to influence the interferability of the illuminating light beam 1. If splitting the illuminating light beam 1 into a plurality of partial beams 3 and 4 does not disrupt the interferability of the illuminating light beam 1, the interferability can be influenced in this way.

A central part of the embodiment is the splitting device 2, by means of which partial beams 3 and 4 are generated which simultaneously illuminate the same plane of the specimen 7 via the mirror arrangement 5. The unit 11 for controlling and/or influencing the coherence is used to control the interferability of the partial beams 12 and 13 in the region of the specimen 7.

In the embodiment according to FIG. 1, a unit 10 for respectively generating a light sheet from the partial beams 3 and 4 is provided. In this case, this may for example be a scanning system for scanning the illumination plane using a thin thread of light or may be an anamorphic focusing system in the form of cylinder optics. If the combination of splitting device 2 and illumination optics 9 generates a light sheet in the specimen 7 without additional auxiliary means, the unit 10 for generating a light sheet can be omitted.

The purpose of the illumination optics 9 is to couple the illuminating light into the specimen chamber comprising the embedding medium 15 and, in combination with the unit 10 for light-sheet generation and the mirror arrangement 5, to generate the light sheets in the specimen 7. It is expedient to produce a rigid mechanical connection between the illumination optics 9 and the mirror arrangement 5. In order to produce suitable relative positioning between the mirror arrangement 5 and the specimen 7, it may be necessary to arrange a spacer 16 below the specimen 7 to raise it up.

As a contrast method for imaging, luminescence (fluorescence or phosphorescence) is suitable in particular, but dark-field contrast is also possible. The scattered or luminescent light emitted from the specimen 7 in the form of an aperture beam 18 is collected by means of the detection optics 8 and imaged onto a position-sensitive detector, such as a camera chip. For volume imaging, the specimen 7 can be axially moved using the specimen carrier 17, while the illumination optics 9 together with the mirror arrangement 5 and the detection optics 8 remain stationary.

The mirror arrangement 5 may consist of an opposing pair of mirrors if the illuminating light beam 1 is split into two partial beams 3 and 4. There may, however, be N mirrors if said beam is split into N partial beams. In this case, N does not necessarily have to be an even number. The mirror arrangement 5 may, however, also be a ring mirror, or a plurality of ring mirror segments, arranged around the specimen 7. A change in the geometry of the light sheets 12 and 13 caused by an uneven mirror surface may be compensated by means of the unit 10 by corresponding correction optics when splitting the beam.

FIG. 2 is a schematic view, viewed from two sides, of an embodiment of the illumination optics and of the unit for light-sheet generation, both components being formed by a simple cylindrical lens 20.

Figure 3:
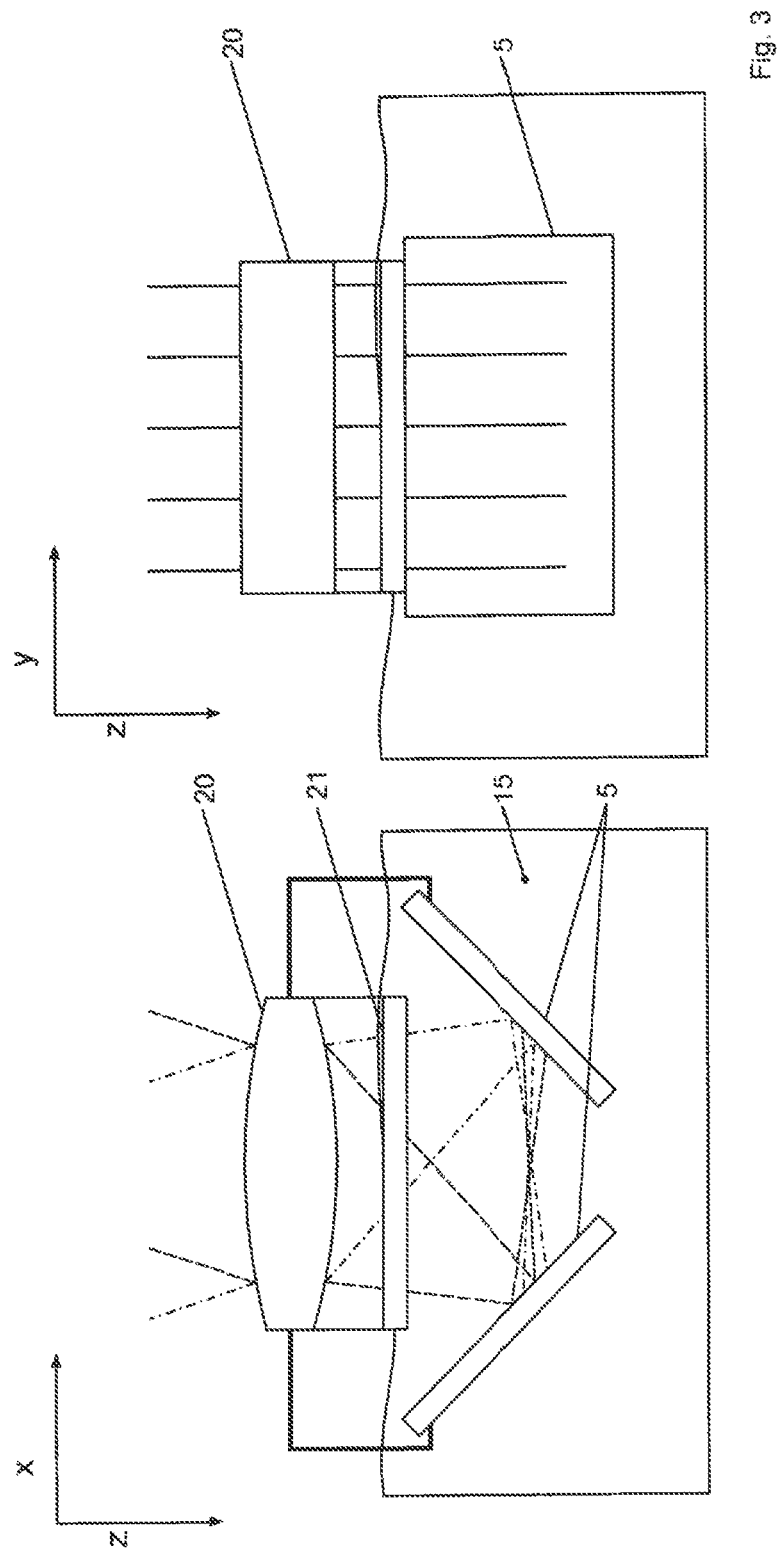
FIG. 3 is a schematic view of another embodiment of the illumination optics from two sides.

FIG. 3 is a schematic view, from two directions, of another embodiment of the illumination optics and of the unit for light-sheet generation, both components being formed by a simple cylindrical lens 20 in this case too. In addition, a plane plate 21 is also provided to produce a defined surface transitioning into the embedding medium 15.

Figure 4:
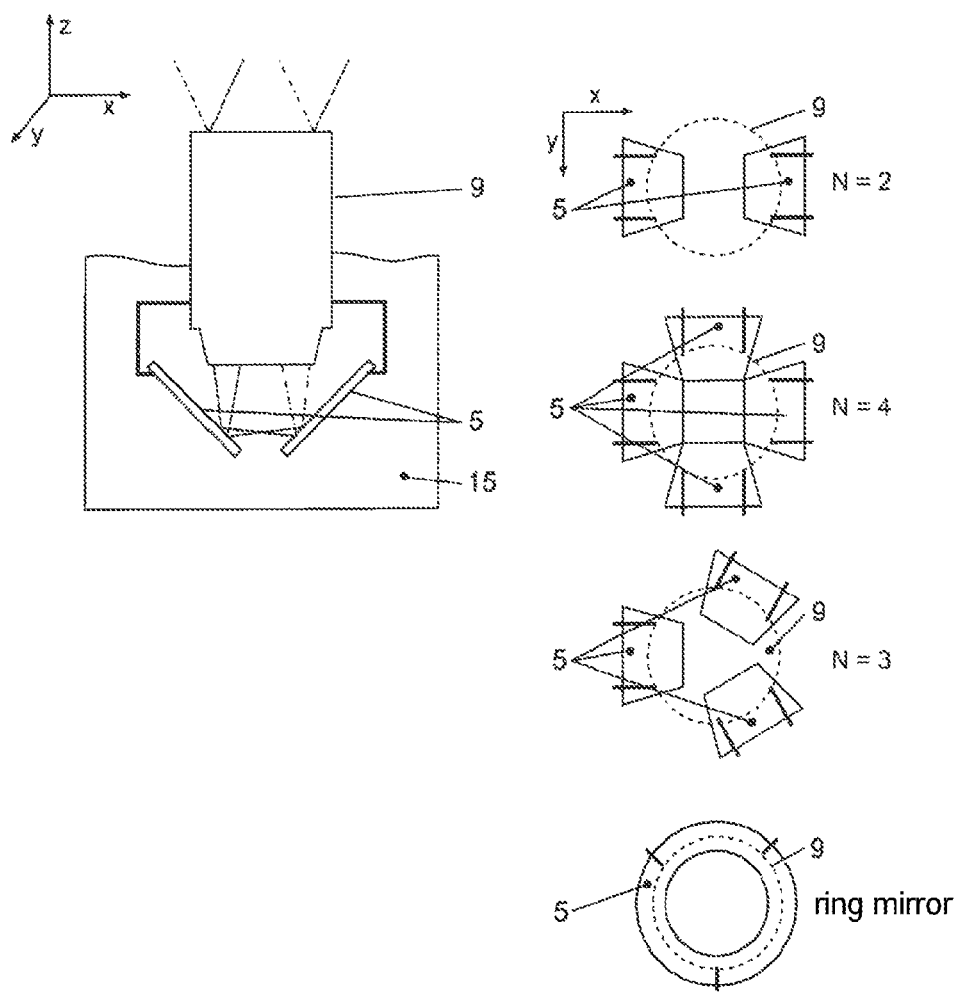
FIG. 4 is a schematic view of another embodiment of the illumination optics and various options for producing the mirror arrangement.

FIG. 4 is a schematic view of another embodiment of the illumination optics 9, said optics specifically being a microscope lens in this case. The light sheets are generated in a separate unit 10 or module in this case.

Furthermore, the right-hand half of FIG. 4 shows various options for producing the mirror arrangement 5. In this case, said arrangement is specifically two, three or four individual mirrors, or a ring mirror.

Figure 5:
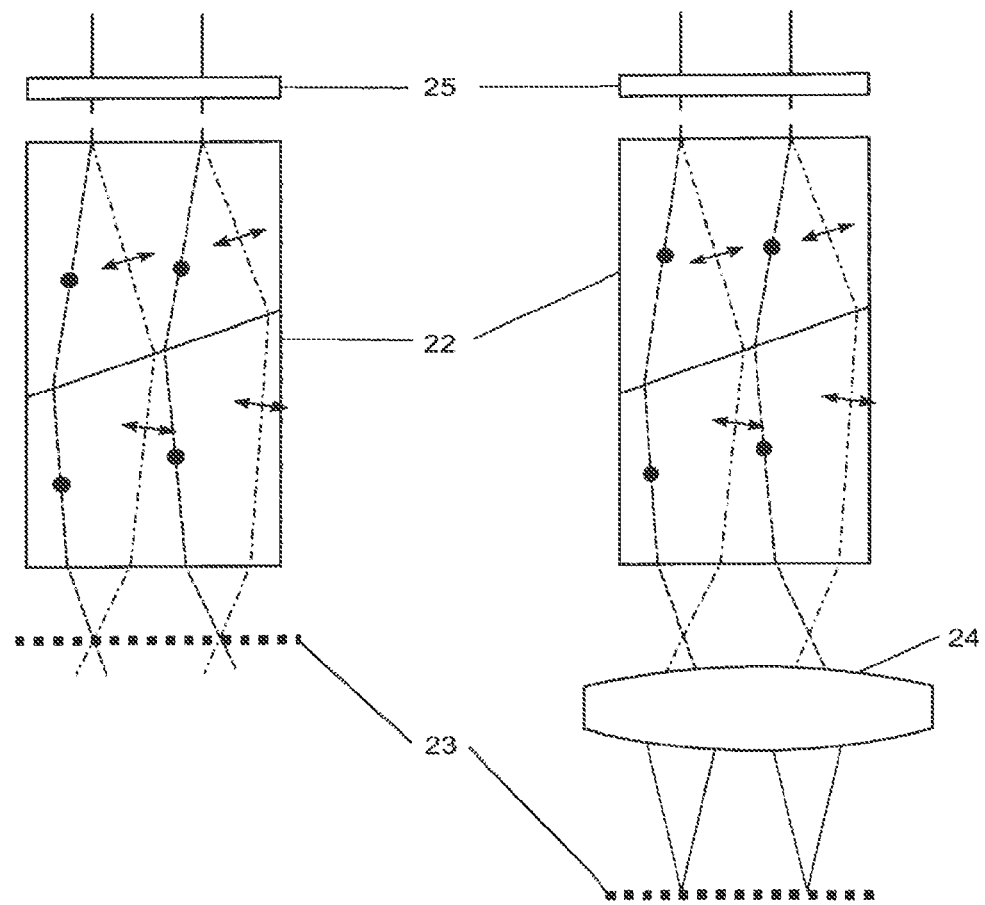
FIG. 5 is a schematic view of two embodiments of the splitting device.

Various methods may be used for splitting the illuminating light beam 1 into a plurality of partial beams 3 and 4. One option is polarisation-optical methods according to FIG. 5. By introducing $\lambda/2$ delay elements 25, the polarisation direction of linearly polarised illuminating light can be controlled relative to the fast axis of the Nomarski prism, and thus the intensity ratio of the partial beams can be set. FIG. 5 is a schematic view of two embodiments of a splitting device. In this case, a correspondingly cut Nomarski prism 22 is illuminated with light which is linearly polarised by 45° to the fast axis or with circularly polarised light. The two emerging partial beams are then polarised mutually orthogonally and are at angle of $\pm\alpha$ to the optical axis. The design of the prism 22 may provide that the exit pupil 23 is arranged outside the prism 22. If this is not the case, both beams can be imaged onto a common exit pupil 23 using anamorphic optics 24.

In another embodiment, two arrangements of the above-described type may be arranged in succession, the second system being rotated by 45° along the optical axis. Four partial beams are thus produced which can be imaged onto a common exit pupil.

Figure 6:
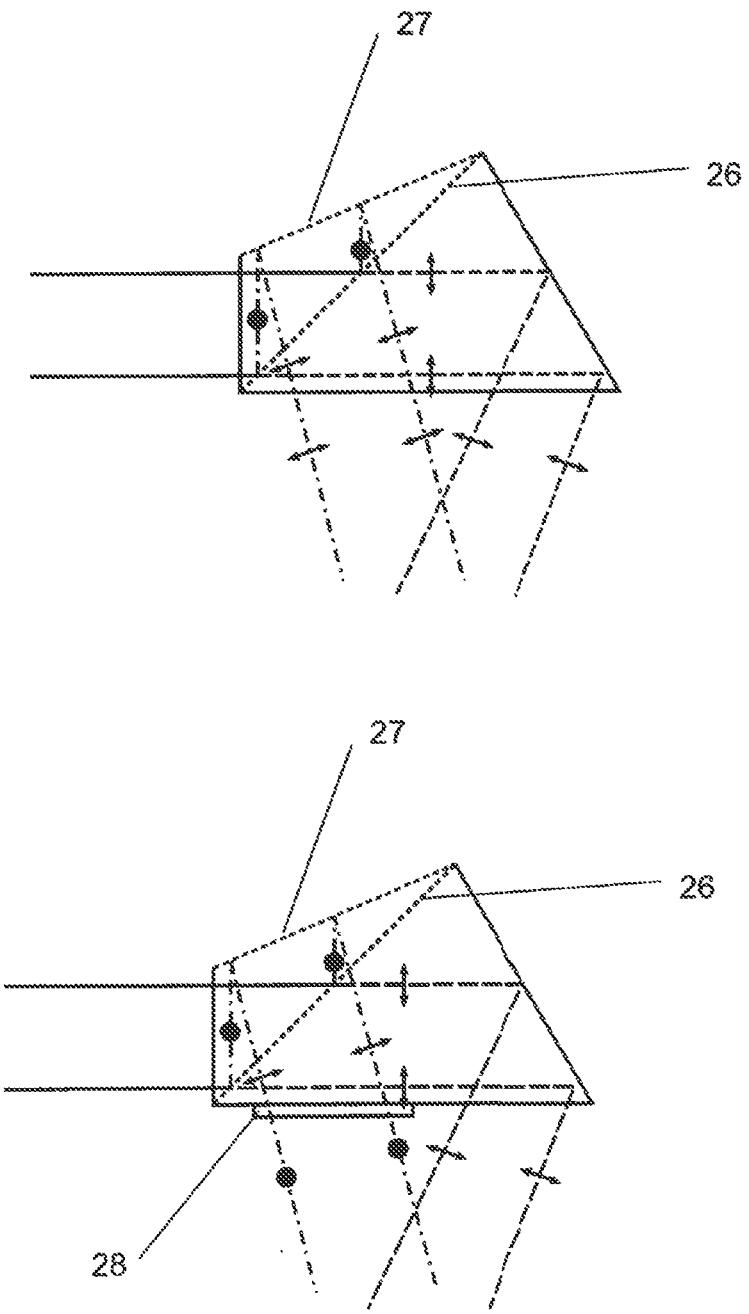
FIG. 6 is a schematic view of further embodiments of the splitting device.

FIG. 6 is a schematic view of another embodiment of a splitting device, a particular prism arrangement ensuring that the illuminating light is split into two partial beams. This design may have a polarisation-splitting layer 26 and a $\lambda/2$ layer 27. Perpendicular polarisation directions may be produced by an additional $\lambda/2$ layer 28. In this case, two systems can also be cascaded.

Figure 7:
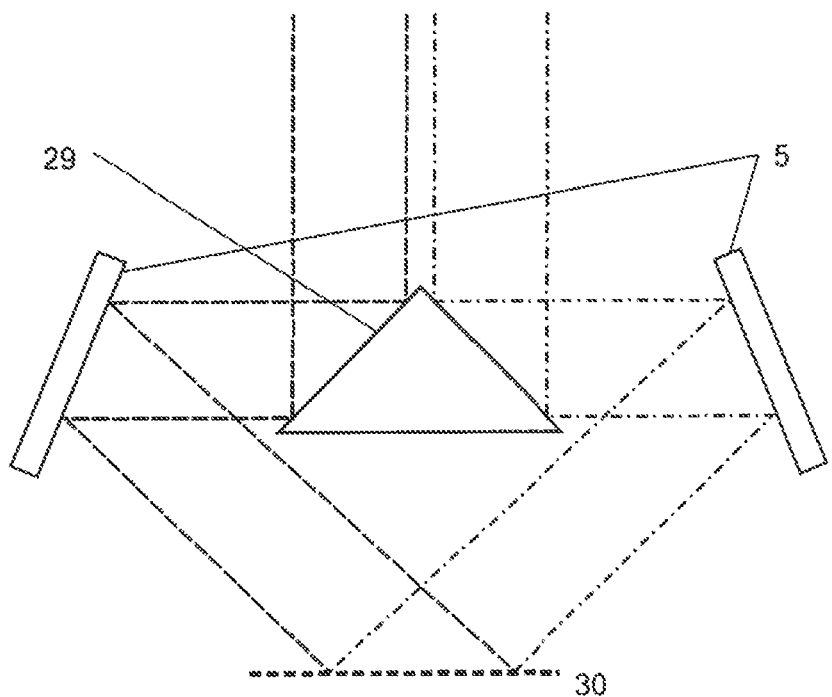
FIG. 7 is a schematic view of another embodiment of the splitting device.

It is also possible to generate a plurality of partial beams having the same polarisation by means of a pupil division. In such an arrangement, the interferability of the individual partial beams can be influenced separately by changing the coherence length. FIG. 7 is a schematic view of another embodiment of a splitting device, a reflective prism 29 being used for pupil division into N partial beams, for example a roof prism for two partial beams, a tetrahedral prism for three partial beams, a pyramidal prism for four partial beams, etc. In this case, the individual partial beams are again imaged onto a common exit pupil 30 using a suitable mirror arrangement 5.

Figure 8:
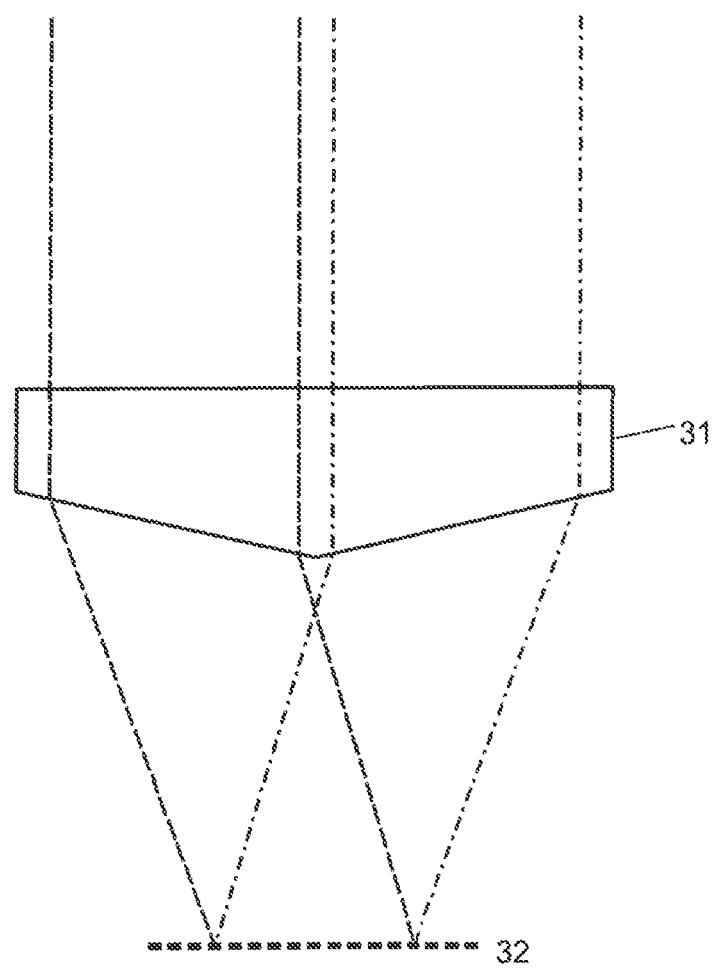
FIG. 8 is a schematic view of another embodiment of the splitting device.

FIG. 8 is a schematic view of another embodiment of a splitting device. In this case, a transmissive prism 31 is used to generate a plurality of partial beams in transmission. Said beams can be imaged onto a common exit pupil 32 using suitable optics.

In another embodiment, it is also possible to generate a continuous polar angle spectrum (ring) of illuminating partial beams using an axicon. Using suitable optics, this ring can be imaged into a common exit pupil.

Another embodiment, which makes it possible to continuously split the illuminating light beam 1, consists in using reflective instead of transmissive optics. Here, reference can be made to the embodiment in FIG. 7, it being possible to use a mirrored cone in this case instead of a reflective prism 29, and the resulting light being imaged onto an exit pupil 30 by means of a ring mirror 5.

Figure 9:
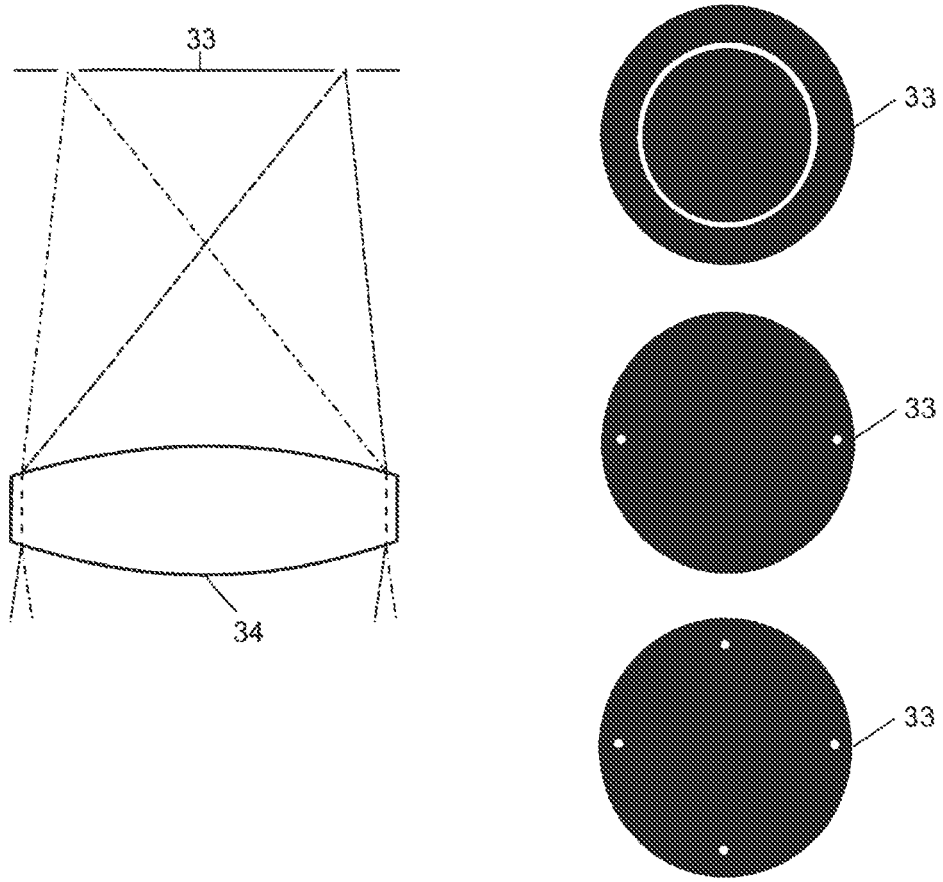
FIG. 9 is a schematic view of another embodiment of the splitting device and different forms of diaphragm.

FIG. 9 is a schematic view of another embodiment of a splitting device. In this case, a continuous polar angle spectrum is produced with a fixed azimuth angle, a ring diaphragm 33 being used for this purpose which is imaged by imaging optics 34, the ring diaphragm being in the object surface thereof. The diaphragm may also have punctiform passages or passages in the shape of a circular segment for generating a discrete polar angle spectrum. For this purpose, the right-hand half of FIG. 9 shows examples of one ring diaphragm 33 and two ring diaphragms 33 having discrete punctiform passages.

In another embodiment, the beam splitting and the light-sheet generation takes place in a diffractive optical element. A combination of diffractive, refractive and reflective elements may also be used for light-beam splitting, possibly in combination with light-sheet generation.

In the case of continuous pupil division, for example the embodiments according to FIG. 8 and FIG. 9, a light ring is imaged into the specimen by means of the illumination optics, preferably a microscope lens, and a mirror arrangement 5, preferably a ring mirror, such that the partial beams generate a light sheet from all polar angles. Separate light-sheet generation is not necessary in this case. Furthermore, in the case of light-sheet generation by means of the illumination optics (embodiments according to FIGS. 2 and 3), separate light-sheet generation is not necessary.

Figure 10:
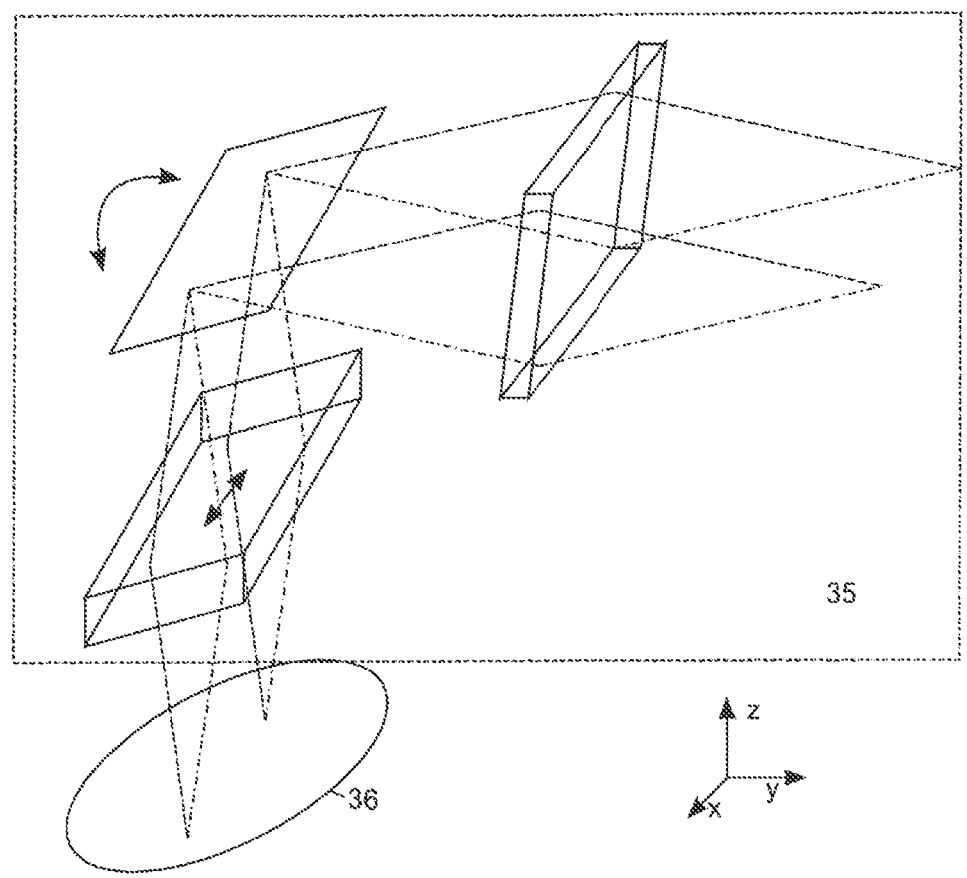
FIG. 10 is schematic view of an embodiment of light-sheet generation.

In all other cases, the light sheet according to the embodiment shown schematically in FIG. 10 of light-sheet generation can be generated perpendicularly to the applied field angle by a scanning movement of a scanning system 35, and collimated illumination of the pupil 36 of the illumination optics can be generated.

Figure 11:
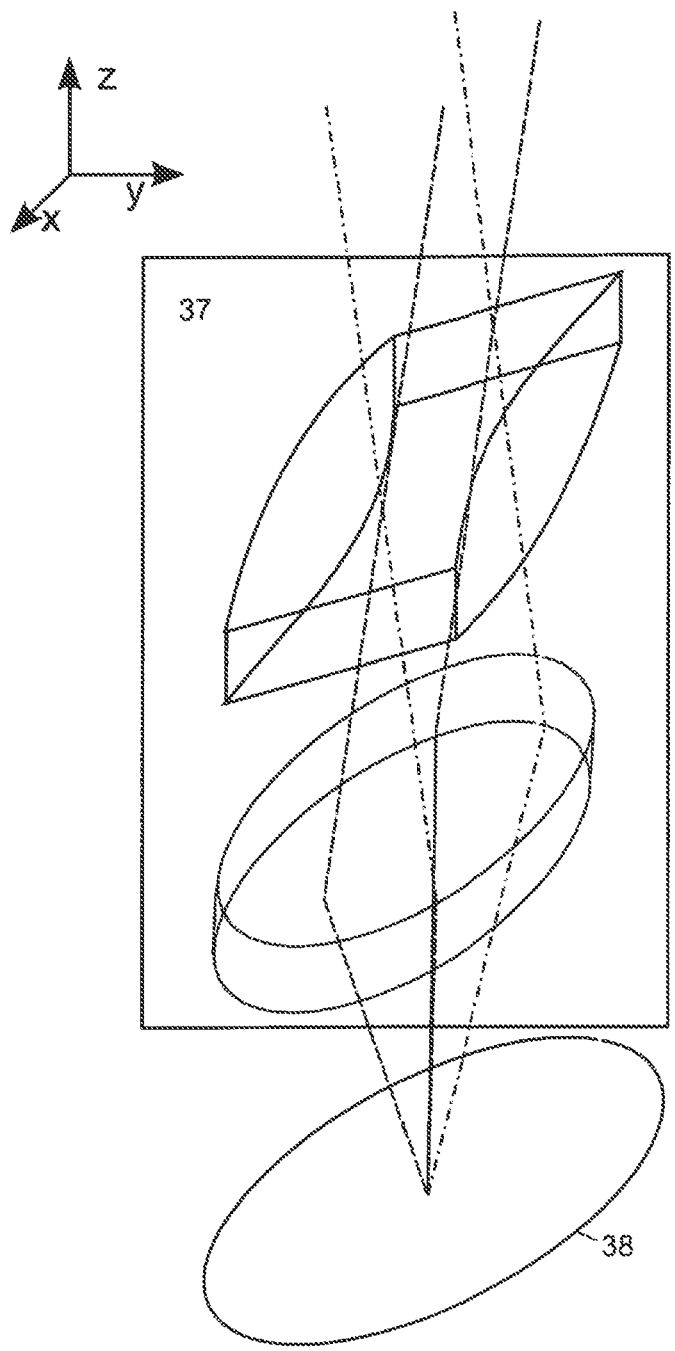
FIG. 11 is a schematic view of another embodiment of light-sheet generation.

FIG. 11 is a schematic view of another embodiment of light-sheet generation, the light sheet being generated in this case by anamorphic focusing 37 of the partial beams into the entrance pupil 38 of the illumination optics, preferably a microscope lens. In this case, the azimuth of the focusing direction is perpendicular to the field angle of the partial beam.

Two different concepts can be implemented for controlling the interferability of the partial beams. If two partial beams are used, the polarisation state of the two partial beams can be controlled. In the embodiments according to FIG. 5 and FIG. 6, this can be carried out by introducing a $\lambda/2$ plate into a partial beam, provided that the partial beams are spatially separate from one another. If the partial beams are not spatially separate, both partial beams may be projected in a polarisation direction by means of a linear polariser rotated by 45°.

If N>2 partial beams are used, the coherence of the illuminating light may be disrupted by introducing a (rotating) scattering plate, so that there can be no interference.

It may be necessary to vary the polar angle of the direction from which the illumination is coming, in order to further reduce shading effects.

In another embodiment, the entire illumination system, or at least the splitting device and the mirror arrangement, could be mechanically rotated about the optical axis.

In another embodiment, the mirror arrangement could be formed such that light-sheet illumination is possible from a plurality of polar directions, for example with a plurality of mirror pairs or a ring mirror. It is then sufficient to mechanically rotate the splitting device and the light-sheet generation about the optical axis.

In another embodiment, the mirror arrangement could be such that light-sheet illumination is possible from a plurality of polar directions. In this case, an optical rotational element (a rotary prism or K mirror) could be used between the unit for light-sheet generation and the illumination optics in order to rotate the polar angle of the illumination.

In another embodiment, the embodiments according to FIG. 7, 8 or 9 could, when using an axicon or a mirrored cone with respect to the embodiments in FIGS. 8 and 7 respectively, be used to generate the partial beams, and a slit diaphragm for a limitation to two opposing polar angle ranges. In this embodiment, the polar angle $\pm\beta$ of the counter-rotating light sheets may be determined by rotating the slit diaphragm.

With respect to further advantageous embodiments of the teaching according to the invention, reference is made to the general part of the description and to the accompanying claims to avoid repetition.

Finally, it should be expressly stated that the above-described embodiments merely serve to explain the claimed teaching, but the teaching is not limited to the embodiments.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 illuminating light beam
2 splitting device
3 partial beam
4 partial beam
5 mirror arrangement
6 illumination region
7 specimen
8 detection optics
9 illumination optics
10 unit or module for light-sheet generation
11 unit or module for controlling and/or influencing coherence
12 partial beam for generating a light sheet 13 partial beam for generating a light sheet
14 specimen container
15 embedding medium
16 spacer
17 specimen carrier
18 aperture beam
19 photodetector/camera
20 cylindrical lens
21 plane plate
22 Nomarski prism
23 exit pupil
24 optics
25 delay element
26 layer
27 λ/2 layer
28 λ/2 layer
29 reflective prism
30 exit pupil
31 transmissive prism
32 exit pupil
33 diaphragm
34 imaging optics
35 scanning system
36 pupil
37 focusing
38 entrance pupil

The invention claimed is:

1. An optical arrangement in a microscope, comprising:
an illumination device configured to generate an illuminating light beam extending on an illumination side,
a splitting device configured to split the illuminating light beam into at least two partial beams,
a light sheet generator configured to generate at least two light sheets from the partial beams;
a mirror arrangement configured to reflect the light sheets into an illumination region for plane illumination of a specimen,
detection optics arranged on a side of the illumination region facing away from the illumination side, and
illumination optics arranged on the illumination side and disposed coaxially with the detection optics about an optical axis, the illumination optics being configured to direct the light sheets onto the mirror arrangement,
wherein the partial beams or light sheets are spaced from the optical axis in a predeterminable manner and are guidable in parallel with the optical axis or close to the optical axis at an angle that differs from 0° to the optical axis.

2. The optical arrangement according to claim 1, wherein the mirror arrangement comprises one or more groups of mirrors or plane mirrors, or a ring mirror or a plurality of ring mirror segments.

3. The optical arrangement according to claim 1, wherein the splitting device comprises polarisation optics or elements for pupil division, or at least one prism or diaphragm.

4. The optical arrangement according to claim 1, wherein the light sheet generator is a separate unit or a part of the illumination optics and includes cylindrical optics or a scanner.

5. The optical arrangement according to claim 1, further comprising a module configured to control or influence coherence of the illuminating light beam.

6. The optical arrangement according to claim 1, further comprising a unit configured to control or influence interferability of the partial beams or the light sheets in the illumination region.

7. The optical arrangement according to claim 1, further comprising a unit configured to selectively influence polarisation state or coherence length of at least one of the partial beams or the light sheets.

8. The optical arrangement according to claim 1, further comprising a unit configured to change a phase of at least one of the partial beams or the light sheets.

9. The optical arrangement according to claim 1, wherein a polar angle of an incident direction of the partial beams or the light sheets is settable or adjustable relative to the illumination region or relative to the specimen.

10. A microscope comprising an optical arrangement according to claim 1.

11. The optical arrangement according to claim 3, wherein the splitting device is formed as a module and comprises reflective or transmissive elements.

12. The optical arrangement according to claim 9, wherein the splitting device and the mirror arrangement are rotatable about the optical axis.

* * * * *